United States Patent [19]
Holzschuh

[11] Patent Number: 4,786,244
[45] Date of Patent: Nov. 22, 1988

[54] COUPLING DEVICE

[75] Inventor: Johann Holzschuh, Meinerzhagen, Fed. Rep. of Germany

[73] Assignee: Battenfeld GmbH

[21] Appl. No.: 114,417

[22] Filed: Oct. 28, 1987

[30] Foreign Application Priority Data

Nov. 4, 1986 [DE] Fed. Rep. of Germany ... 8629186[U]

[51] Int. Cl.[4] ............................................. B29C 45/66
[52] U.S. Cl. ...................... 425/192 R; 264/328.16; 285/31; 425/547; 425/548; 425/552; 425/589
[58] Field of Search ............... 425/192 R, 547, 548, 425/407, 552, 577, 588, 589, DIG. 110, DIG. 246; 264/328.14, 328.16; 285/9.1, 31, 33, 394

[56] References Cited

U.S. PATENT DOCUMENTS

| | | | |
|---|---|---|---|
| 2,182,400 | 12/1939 | Husted | 264/328.16 X |
| 2,344,176 | 3/1944 | Shaw | 425/548 X |
| 4,201,742 | 5/1980 | Hendry | 264/328.16 X |
| 4,251,479 | 2/1981 | Pecht et al. | 264/328.16 X |
| 4,403,810 | 9/1983 | Bieneck | 425/589 |
| 4,518,338 | 5/1985 | Hehl | 425/547 X |
| 4,540,359 | 9/1985 | Yamazaki | 425/589 X |
| 4,544,340 | 10/1985 | Hehl | 425/589 X |

Primary Examiner—Richard L. Chiesa
Attorney, Agent, or Firm—Toren, McGeady & Associates

[57] ABSTRACT

A coupling device of the insertion or plug-in type for connecting lines which conduct flowing media, preferably pressurized fluids, to the mold halves of a molding tool in an injection molding machine. The coupling device includes a first coupling member, for example, a coupling nipple, mounted on an adapter plate of the injection molding machine and a second coupling member, for example, a coupling sleeve, mounted on a mold half of the molding tool. A locking device is used for fixing the two coupling members in an engaged position. The locking device is biased into its locking position by means of a spring and can be moved against the biasing force by means of an electromagnet from the locking position into a releasing position.

6 Claims, 2 Drawing Sheets

COUPLING DEVICE

BACKGROUND OF THE INVENTION

1. Field of the Invention

The present invention relates to a coupling device of the insertion or plug-in type for feeding flowing media, preferably pressurized fluids, to the mold halves of the molding tools of injection molding machines. The coupling device has two coupling members. One of the coupling members, for example, a coupling nipple, is mounted on the adapter plate of the injection molding machine and the other coupling member, for example, a coupling sleeve, is mounted on a mold half of the molding tool.

2. Description of the Prior Art

Coupling devices of the above-described type are known and used in injection molding machines. The coupling devices are generally used in conjunction with quick change and/or quick gripping devices for the molding tools and, therefore, are mounted in such a way that the coupling members are automatically coupled and uncoupled when a molding tool change is carried out.

It is the primary object of the present invention to provide a coupling device in which the coupling members are automatically coupled in correct operational engagement when the molding tools are assembled in the injection molding machine, while the coupling members must be separated by means of forcible actuation when the molding tools are disassembled from the injection molding machine. In addition, the coupling members are to remain fixed in their operational positions even if the energy supply to the coupling device should break down.

SUMMARY OF THE INVENTION

In accordance with the present invention, the coupling device includes a coupling means capable of fixing the two coupling members in an engaged position. The locking means is biased, particularly by means of a spring, into its locking position. The locking means is movable by means of an electromagnet against the biasing force from the locking position into a releasing position.

When the molding tool is assembled in the injection molding machine, the locking means is moved as the two coupling members meet each other against the biasing force acting on the locking means and is subsequently moved into the locking position by means of the biasing force. On the other hand, when the molding tool is disassembled from the injection molding machine, the locking means must be moved by means of the electromagnet against the biasing force from the locking position before the coupling members can be separated from each other. When the current supply to the coupling device is interrupted, the electromagnet cannot be actuated, so that the locking means remains in its locking position under the influence of the biasing force and, thus, an automatic separation of the coupling device is prevented.

In accordance with an advantageous feature of the present invention, the locking means of the coupling device includes a locking bar guided in the coupling sleeve and a locking recess provided in the coupling nipple.

In accordance with another feature of the invention, the locking bar may define a hole for receiving the coupling nipple, wherein a locking cam is defined at this hole in the direction of movement of the locking bar. The shape of the locking cam is such that it complements the shape of the locking recess of the coupling nipple.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
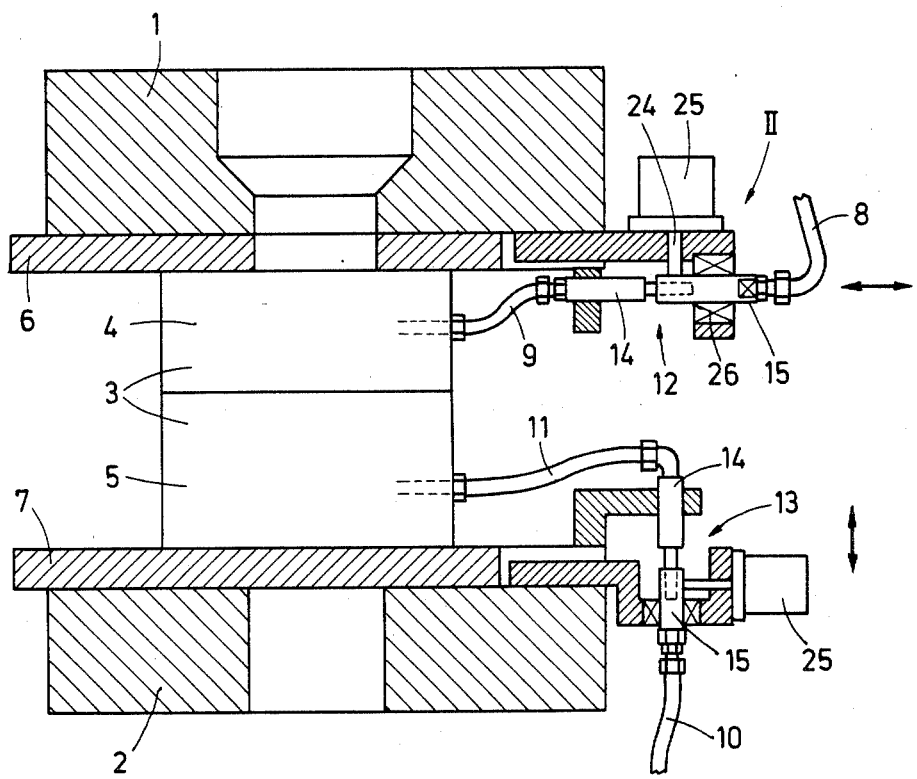
FIG. 1 is a sectional view of a molding tool mounted between the adapter plates of an injection molding machine and shows the coupling devices for the supply of flowing media to the molding tool.

FIG. 1 of the drawing shows a stationary adapter plate 1 of an injection molding machine and an adapter plate 2 which is movable relative to adapter plate 1. A molding tool 3 is mounted between these adapter plates 1 and 2. Molding tool 3 has two mold halves 4 and 5. Mold half 4 is mounted on adapter plate 1 by means of an intermediate plate 6, while a similar intermediate plate 7 is used for connecting the mold half 5 with the movable adapter plate 2.

A flowing medium, preferably a pressurized fluid, for example, for heating or cooling, can be admitted to each mold half 4 and 5 of the molding tool 3 through pressure lines 8, 9 and 10, 11, respectively. The pressure lines 8 and 9 are connected to each other by means of an insertion-type coupling device 12 and the pressure lines 10 and 11 are connected to each other by means of an insertion-type coupling device 13. These connections are effected as soon as molding tool 3 has been correctly placed between the two adapter plates 1 and 2 of the injection molding machine. Coupling devices 12 and 13 must be disengaged when the molding tool 3 is to be disassembled from the injection molding machine.

Each coupling device 12 or 13 includes two corresponding coupling members 14 and 15, i.e., a coupling nipple 14 and a coupling sleeve 15.

A coupling nipple 14 each is mounted on the adapter plate 6 and 7 of the mold halves 4 and 5, respectively, of the molding tool 3. The coupling sleeves 15, on the other hand, are supported by the adapter plates 1 and 2, respectively, of the injection molding machine.

Coupling device 12 is mounted relative to the injection molding machine in such a way that its coupling nipple 14 and its coupling sleeve 15 are engaged and disengaged when the molding tool 3 is moved between the adapter plates 1 and 2 transversely of its longitudinal axis. On the other hand, the coupling nipple 14 and the coupling sleeve 15 of coupling device 13 are engaged and disengaged when the movable adapter plate 2 of the injection molding machine is moved relative to the molding tool 3 parallel to its longitudinal axis.

Figure 2:
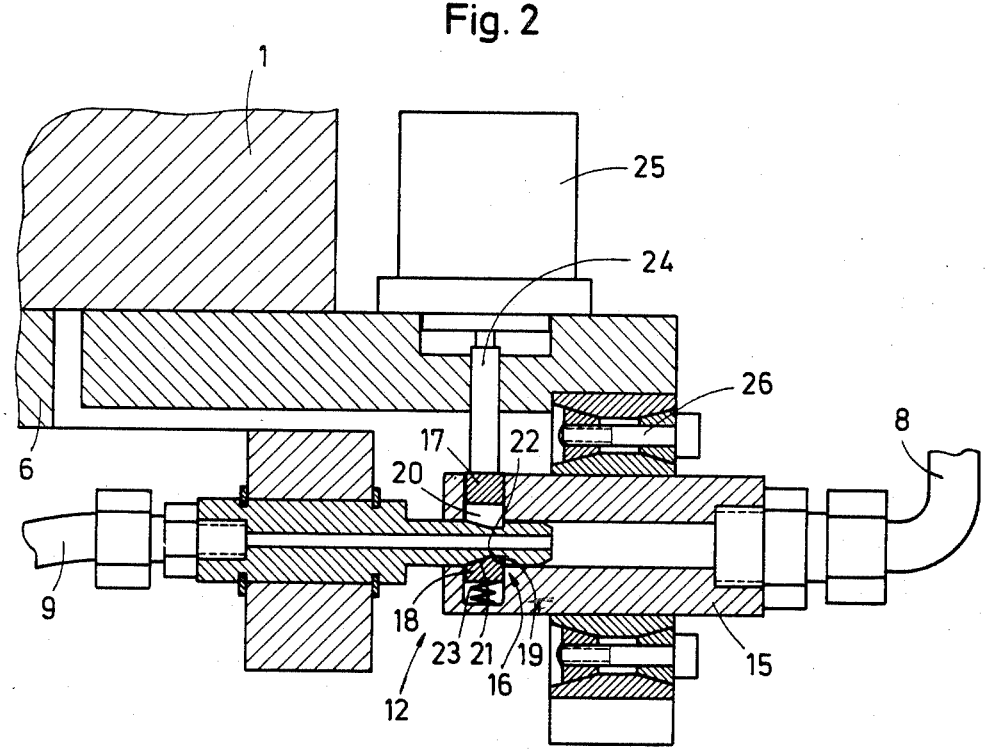
FIG. 2 is a sectional view on a larger scale, of a detail of the machine shown in FIG. 1 designated by arrow II.

Coupling device 12 is illustrated in FIG. 2 of the drawing on a larger scale. FIG. 2 shows that the coupling nipple 14 is fixed relative to the coupling sleeve 15 in the engaged position of the coupling device 12 by means of a locking means 16. The locking means 16 includes a locking bar 17 with a locking cam adjustable within the coupling sleeve 15 transversely of the longitudinal axis of the coupling sleeve 15, and a locking recess 19 defined in the circumferential surface of the coupling nipple 14. Recess 19 has a shape which complements the shape of the locking cam 18.

Locking cam 18 of locking bar 17 is provided at one end of an oblong hole 20 formed in locking bar 17 and is constructed as a catch member. Thus, locking cam 18 has an inclined contact surface 21 and a stop surface 22 which extends essentially in longitudinal direction of the locking bar 17 and defines an acute angle with contact surface 21.

The locking bar 17 is biased by means of a compression spring 23 provided in coupling sleeve 15. Compression spring 23 is mounted in such a way that it biases the locking cam 18 into the locking position which is illustrated in FIG. 2.

Locking bar 17 can be moved against the biasing force of compression spring 23 out of the locking position when the beveled front end of the coupling nipple 14 meets the contact surface 21 of the locking cam when the coupling nipple 14 is inserted in the coupling sleeve 15. As soon as the locking recess 19 of coupling nipple 14 has reached alignment with the locking cam 18 of the locking bar 17, the locking cam 18 is moved by the biasing force of the compression spring 23 into engagement with the locking recess 19 and, in this position, the stop surface 22 of the locking cam 18 prevents removal of the coupling nipple 14 from the coupling sleeve 15.

When the coupling device 12 is to be separated, the locking bar 17 must be moved by means of a tappet 24 against the biasing force of compression spring 23 in such a way that locking cam 18 is disengaged from locking recess 19. For this purpose, tappet 24 is connected to an electromagnet 25. When electromagnet 25 is actuated, the tappet 24 is moved forwardly and, thus, moves locking bar 17 including locking cam 18 against the biasing force of the compression spring 23 into the releasing position. Coupling nipple 14 can now be pulled axially out of the coupling sleeve 15.

In order to make it possible at any time to adapt the coupling devices 12 and 13 to different mounting conditions of molding tools 3, for example, the coupling sleeve 15 is fixed to the respective adapter plate 1 or 2 by means of an annular clamping element 26 of known construction. This element 26 can be easily loosened and tightened, so that the coupling sleeve 15 can be moved in axial direction as desired.

While a specific embodiment of the invention has been shown and described in detail to illustrate the application of the inventive principles, it will be understood that the invention may be embodied otherwise without departing from such principles.

What is claimed is:

1. In an injection molding machine having a coupling device of the insertion type for coupling lines which supply flowing media to mold halves of a molding tool of the injection molding machine, the injection molding machine including adapter plates for mounting the molding tool, the coupling device comprising first and second coupling members, the first coupling member connected to an adapter plate of the injection molding machine and the second coupling member connected to a mold half of the molding tool, a locking means for fixing the first and second coupling members in an engaged position relative to each other, the locking means being movable between a locking position and a releasing position, a biasing means for biasing the locking means into the locking position, and an electromagnet for moving the locking means against the biasing means from the locking position into the releasing position.

2. The coupling device according to claim 1, wherein the flowing media are pressurized fluids.

3. The coupling device according to claim 1, wherein the first coupling member is a coupling nipple and the second coupling member is a coupling sleeve.

4. The coupling device according to claim 1, wherein the biasing means is a spring.

5. The coupling device according to claim 1, wherein the first coupling member defines a locking recess, the locking means being a locking bar guided in the second coupling member, the locking bar capable of engaging in the locking recess.

6. The coupling device according to claim 5, wherein the locking bar defines a hole for receiving the first coupling member, the locking bar defining at the hole in the direction of movement of the locking bar a locking cam, the locking cam having a shape which complements the locking recess.

* * * * *